(12) United States Patent
Krösswang-Ridler et al.

(10) Patent No.: US 11,876,376 B2
(45) Date of Patent: Jan. 16, 2024

(54) SYSTEM AND METHOD FOR OPERATING AN INVERTER

(71) Applicant: Fronius International GmbH, Pettenbach (AT)

(72) Inventors: Thomas Krösswang-Ridler, Pettenbach (AT); Markus Brandstötter, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 136 days.

(21) Appl. No.: 17/754,218

(22) PCT Filed: Oct. 2, 2020

(86) PCT No.: PCT/EP2020/077632
§ 371 (c)(1),
(2) Date: Mar. 28, 2022

(87) PCT Pub. No.: WO2021/064161
PCT Pub. Date: Apr. 8, 2021

(65) Prior Publication Data
US 2022/0344942 A1 Oct. 27, 2022

(30) Foreign Application Priority Data
Oct. 2, 2019 (EP) ..................... 19201129

(51) Int. Cl.
*H02J 3/38* (2006.01)
*H02J 3/28* (2006.01)

(52) U.S. Cl.
CPC ................ *H02J 3/381* (2013.01); *H02J 3/28* (2013.01); *H02J 3/38* (2013.01); *H02J 2300/26* (2020.01)

(58) Field of Classification Search
CPC .......... H02J 3/12–144; H02J 3/28–322; H02J 3/38–50; H02J 2300/20–28; G05F 1/67
See application file for complete search history.

(56) References Cited

U.S. PATENT DOCUMENTS 10,139,847 B2   11/2018   Ramezan Pour Safaei
2013/0220591 A1*  8/2013   Hayashida ............ F24H 15/164
                                                           165/200

(Continued)

FOREIGN PATENT DOCUMENTS

EP    2 701 266 A1   2/2014
EP    2 889 981 A2   7/2015

OTHER PUBLICATIONS

International Search Report corresponding to International Patent Application No. PCT/EP2020/077632, dated Mar. 12, 2020 (4 pages).

*Primary Examiner* — Rexford N Barnie
*Assistant Examiner* — David A Shiao
(74) *Attorney, Agent, or Firm* — Maginot, Moore & Beck LLP

(57) ABSTRACT

An inverter (200) connected to an energy source (100) and configured to supply power to a load network (300) comprising at least one controllable load, said inverter (200) comprising a processor (201) adapted to control the at least one controllable load of the load network (300) is disclosed. The processor (201) comprising: a net load detector (201*a*) detects a net load of the load network (300); a power export analyzer (201*b*) determines an inverter power transfer of the inverter and a grid power transfer of a grid (400); characterized in that a power manager (201*c*) varies the power output of the inverter (200) and a power consumption of the at least one controllable load based on the inverter power (Continued)

transfer, the grid power transfer, an export condition violation and a derating state of the energy source (100).

15 Claims, 2 Drawing Sheets

(56) References Cited

U.S. PATENT DOCUMENTS

| | | |
|---|---|---|
| 2016/0099571 A1 | 4/2016 | Gelonese |
| 2017/0005515 A1* | 1/2017 | Sanders .................. H02J 3/388 |
| 2017/0163038 A1 | 6/2017 | Wallmeier et al. |
| 2017/0336821 A1 | 11/2017 | Ramezan Pour Safaei |
| 2018/0102728 A1* | 4/2018 | Mishra .................... H02S 10/20 |
| 2018/0138731 A1 | 5/2018 | Baba et al. |
| 2019/0165580 A1* | 5/2019 | Doherty ............... G05B 13/042 |
| 2019/0334350 A1* | 10/2019 | Stepa .................. F24D 19/1057 |

* cited by examiner

SYSTEM AND METHOD FOR OPERATING AN INVERTER

PRIORITY CLAIM

This application is a 35 U.S.C. § 371 National Stage Application of PCT/EP2020/077632, filed on Oct. 2, 2020, which claims the benefit of priority to Ser. No. 19/201,129.4, filed on Oct. 2, 2019, in Europe, the disclosures of which are incorporated herein by reference in their entirety.

FIELD OF THE INVENTION

The present invention relates to a system and method for operating a power converter connected to a power source and more particularly to a system and method for operating an inverter to continuously optimize self-consumption of power from the power source while controlling a power fed to a utility grid.

BACKGROUND OF THE INVENTION

With increased use of decentralized energy generators, such as photovoltaic systems, power supply management has changed considerably over time. A photovoltaic system feeds electric power generated by photovoltaic panels to an inverter in order to convert the generated electric DC-power into electric alternating AC-power. The inverter in turn supplies the alternating AC-power to a load network. The power output of the inverter is often connected additionally to a utility grid. Typically, when the power demand of the load network exceeds the power provided by a photovoltaic source, the missing power is obtained from the utility grid. If the power demand of the load network is less than the power provided by the photovoltaic source, then the inverter feeds the surplus power into the utility grid.

However, under certain power export regulations/restrictions to the utility grid existing in certain countries, the owners of the photovoltaic systems opt for self-consumption of the excess power generated by the photovoltaic source instead of feeding it into the utility grid. Owners of the photovoltaic systems can use controllable storage devices as part of the load network to optimize self-consumption of the excess power provided by the power source. For example, a controllable storage device can comprise an electric water heater which consumes surplus power to heat water for household requirements.

Households with a restriction to not export any power to the utility grid require the inverter to limit the power output such that it is not greater than the household's total load consumption. That is, the inverter limits the output power such that the output power of the inverter is less than or equal to the household's total load consumption. This is done by derating the power source, wherein the actual power provided by the photovoltaic source to the inverter is less than an available power source at the photovoltaic modules of the photovoltaic source. But, since the inverter is unaware of the available power at the photovoltaic source during the derating condition, this results in a reduction in the power consumed by the controllable storage devices. Also, since the inverter is not allowed to export any power to the utility grid, the controllable storage devices would not increase the power consumption. This results in a waste of the available power at the photovoltaic source. Hence, the inverter cannot convert a maximum available power at the photovoltaic source into the power output reducing the overall efficiency. Thus, an effective solution is desirable to utilize maximum available power at the photovoltaic source in real-time while abiding grid feed-in regulations.

Accordingly, it is an object of the present invention to provide an apparatus and a method which allow to utilize maximum available power of an energy source while complying with grid feed-in regulations.

This object is achieved by an inverter comprising the features of claim 1 and by a method comprising the features of claim 10.

DETAILED DESCRIPTION OF EMBODIMENTS

Figure 1:
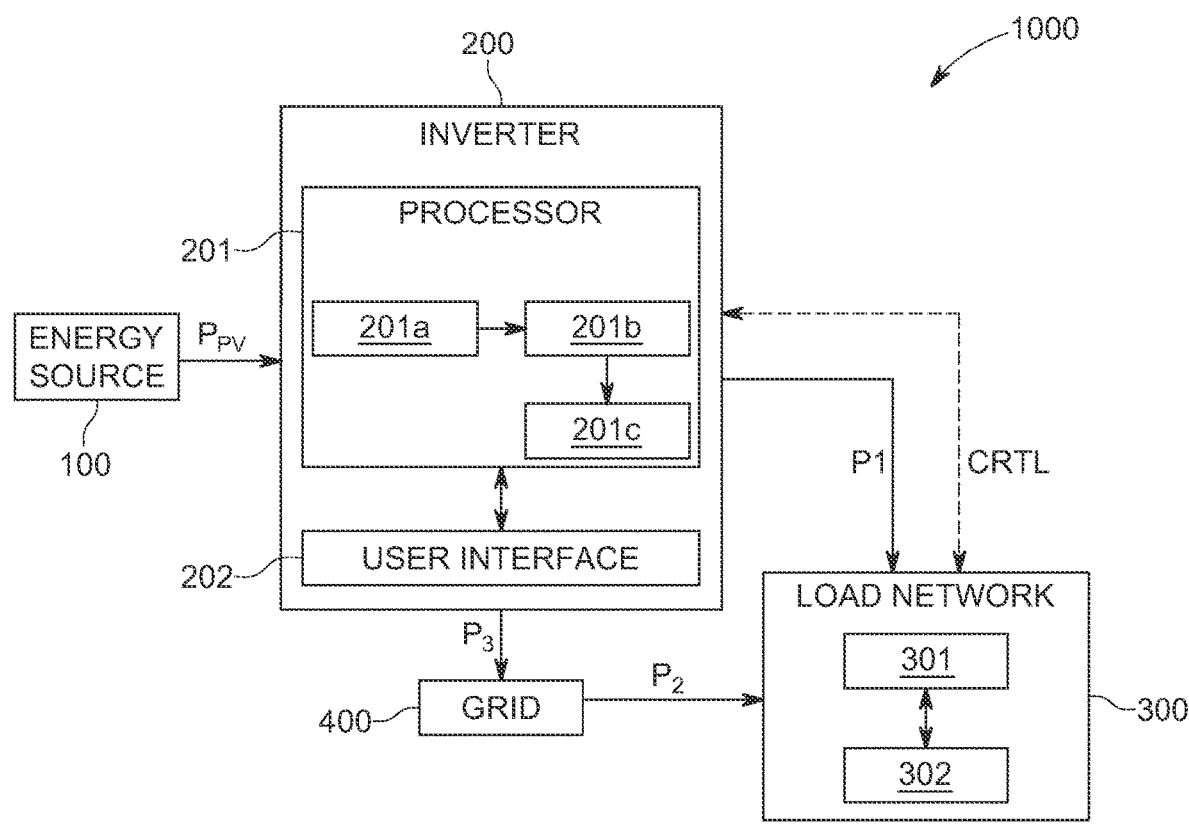
FIG. 1 illustrates a possible embodiment of an architecture of a power generation system with an inverter in accordance with a first aspect of the present invention.

FIG. 1 illustrates a possible embodiment of an architecture of a power generation system 1000 with an inverter 200 in accordance with the first aspect of the present invention. The inverter 200 is connected to an energy source 100 and configured to supply power to a load network 300 comprising at least one controllable load 301. The inverter 200 comprises a processor 201 adapted to control the at least one controllable load of the load network 300. The processor 201 comprises a net load detector 201a which is adapted to detect a net load of the load network 300. The processor 201 further comprises a power export analyzer 201b which is adapted to determine an inverter power transfer of the inverter 200 and a grid power transfer of a grid 400. The power manager 201c varies the power output of the inverter 200 and a power consumption of the at least one controllable load 301 based on the determined inverter power transfer, the determined grid power transfer, an export condition violation and a derating state of the energy source 100. The derating state can be indicated in a possible implementation by a flag. The derating state flag can be read in a possible implementation by the processor 201 of the inverter 200.

In a possible embodiment, the energy source 100 comprises at least one renewable power source such as a photovoltaic plant, a wind farm, a hydroelectric power plant, a biogas plant, a tidal plant, or any combination thereof. The inverter 200 as shown in FIG. 1 is connected to the energy source 100. In an embodiment, the energy source 100 is a photovoltaic unit, which can comprise one or more photovoltaic strings of photovoltaic modules within a photovoltaic array. The inverter 200 converts the DC current received from the photovoltaic unit into an AC current, which can be fed by the inverter 200 to the load network 300. Additionally, the inverter 200 is also connected to the grid 400. The inverter 200 comprises a user interface 202 in communication with the processor 201 of the inverter 200. The user interface 202 can comprise a display screen, a touch screen or a touch pad, a microphone, buttons, lights, an augmented reality display device, a virtual reality display device, a web interface, or any combination thereof. The processor 201 can comprise a microprocessor or a microcontroller. The processor 201 can generate control signals applied to controllable loads 301 to control their power consumption and/or to control the electrical AC-power output by the inverter 200.

The inverter 200 is further configured to supply power (AC-power) to the load network 300 via a local power path.

The load network 300 comprises for example a residential site, a non-residential site or any combination thereof. The load network 300 comprises electricity consuming devices, for example, home appliances such as computers, refrigerators, lamps, air conditioners, etc. The at least one controllable load 301 forms part of the load network 300. The controllable load 301 comprises for example a water heater, a heat pump, a rechargeable battery, etc. The load network 300 can comprise also non-controllable loads 302. The inverter 200 comprises the processor 201 adapted to control the at least one controllable load 301 of the load network 300. The processor 201 comprises the net load detector 201a which detects the net load of the load network 300. The net load of the load network 300 represents the gross electric load of the load network 300. The net load detector 201a transmits details regarding the net load of the load network 300 to the power export analyzer 201b of the processor 201. The loads 301, 302 of the load network 300 can comprise AC-loads consuming AC-power $P_1$ generated by the inverter 200. The processor 201 of the inverter 200 can communicate with the load network 300 via a communication path such as a bus. The communication can be bi-directional, e.g. if a controllable load 301 confirms a changed power consumption to the processor 201 after having received a control signal CRTL from the processor 201 to change its power consumption. The control signal CRTL between the inverter 200 and the load network 300 is represented by the bi-directional dashed line, as shown in the FIG. 1.

The communication can be performed by a predefined communication protocol suited for the respective use case. The communication can be performed on a wired field bus or via a wireless interface. The processor 201 can communicate with sensors and/or smart meters to determine the inverter power transfer and the grid power transfer. In a possible embodiment, the communication is performed as power line communication (PLC). For example, the smart meter is positioned such that the smart meter is in communication with the inverter 200, the grid 400 and the load network 300. The smart meter tracks the inverter power transfer of the inverter 200 and the grid power transfer of the grid 400. The smart meter measures the consumption and production of energy for the power generation system 1000. In another example, the consumption data of the energy for the power generation system 1000 is measured via sensors located at each of the loads of the load network 300 and the grid 400. In an example, the sensors transmit the sensed data to the smart meter via a power line transceiver. The sensors and/or smart meters are not explicitly shown in the FIG. 1.

The power export analyzer 201b determines the inverter power transfer of the inverter 200 and the grid power transfer of the grid 400. The inverter power transfer is a measured power transfer from the inverter 200 to the load network 300 and/or to the grid 400. The grid power transfer is a power transfer from the grid 400 to the load network 300. The flow of power amongst the photovoltaic energy source 100, the inverter 200, the load network 300 and the grid 400 are represented by solid lines in the direction of the flow arrows. The loads 301, 302 of the load network 300 consume AC-power $P_1$ generated by the inverter 200. The power consumed by the load network 300 transmitted by the grid 400 is represented by $P_2$. The flow of power transmitted from the inverter 200 to the grid 400 is represented by $P_3$. The power transmitted from the photovoltaic energy source 100 to the inverter 200 is represented by $P_{PV}$. The total power transmitted by the inverter 200 to the load network 300 and/or the grid 400 is equal to the sum of $P_1$ and $P_3$, and this indicates the inverter power transfer of the inverter 200. Similarly, the grid power transfer from the grid 400 to the load network 300 is represented by $P_2$.

The power manager 201c of the processor 201 of the inverter 200 determines an export condition violation based on the determined inverter power transfer and/or the determined grid power transfer. The power manager 201c evaluates the inverter power transfer and/or the grid power transfer to determine any export condition violation based on the definition of the respective export condition. For instance, the export condition can be region specific and is defined by regional authorities. The export condition violation defines any violation with respect to the defined export conditions. In an example, the export condition refers to an amount of transfer of power to the grid 400 from the inverter 200 at any instance of time. In another example, the power manager 201c considers an amount of transfer of power from the inverter 200 to the load network 300 and/or to the grid 400, and an amount of transfer of power from the grid 400 to the load network 300 at a given instance of time to determine an export condition violation. In another example, the power manager 201c considers a plurality of export conditions based on the inverter power transfer and/or the grid power transfer to determine an export condition violation.

An export condition violation can be defined rule based. It can be defined by one or more rules (e.g. IF-THEN rules) stored in a configuration file. The configuration file can be loaded and stored in a configuration memory of the inverter 200. In a possible embodiment, the configuration file is editable by means of the user interface 202. In a possible embodiment, at least one configuration file can be loaded from a platform, in particular a cloud platform connected via a data network to the inverter 200 by means of a data interface of the inverter 200. The configuration file can be selected and downloaded to the configuration memory of the inverter 200 from a repository of the platform. In a possible embodiment the selection is performed depending on the physical location of the inverter 200 (e.g. in which country the inverter 200 is installed). In a possible embodiment the inverter 200 comprises a GPS receiver to generate coordinates indicating the momentary installation location of the inverter 200. The coordinates can be processed to select automatically a matching configuration file.

In an example, a user of the system 1000 sets a rule which defines an export condition violation via the user interface 202 of the system 1000. The rule is region specific and is defined by the local authorities governing the energy transfer to a public utility grid 400. The rule states that only a maximum of 10% of total power generated by the energy source 100 at any instance of time is permitted to be transmitted to the public utility grid 400. The net load detector 201a transmits details regarding the net load of the load network 300 to the power export analyzer 201b of the processor 201. The power export analyzer 201b determines the inverter power transfer of the inverter 200 and the grid power transfer of the grid 400. The power manager 201c of the processor 201 of the inverter 200 determines an export condition violation when the total power transmitted to the public utility grid 400 exceeds more than 10% of the total power generated by the energy source 100 at any instance of time.

In an embodiment, the export condition represents a zero power feed-in to the grid 400. That is, the power generated by the inverter 200 is completely utilized by the load network 300 such that no power is fed to the grid 400. In other words, the load network 300 self-consumes the power generated by the inverter 200 without exporting any power to the grid 400. The power from the energy source 100 is prevented from reaching the grid 400. In another embodiment, the export condition indicates a maximum exportable power from the energy source 100 to the grid 400 during a pre-defined time interval. In another embodiment, the export condition represents an allowable time period for export of the power from the energy source 100 to the grid 400.

If the power manager 201c determines that there is a violation of the export condition, then the power manager 201c decreases automatically the power output of the inverter 200 and increases automatically the power consumption of the at least one controllable load 301 proportional to the extent of the export condition violation (e.g. deviation from a set value or threshold). The decrease in the power output of the AC power output by the inverter 200 and the increase in the power consumption of the at least one controllable load 301 of the load network 300 is based on a magnitude of the determined export condition violation. The power manager 201c can determine the magnitude of the export condition violation through power measurements performed by sensors or smart meters.

Once the power manager 201c decreases the power output by the inverter 200 and increases the power consumption of the at least one controllable load 301 depending on the magnitude of the export condition violation, the power manager 201c checks for the derating state of the energy source 100. The power manager 201c considers the derating state of the energy source 100 to additionally increase the power of the at least one controllable load 301. This additional amount of increase in the power of the at least one controllable load 301 is a predefined value. In an embodiment, the predefined value of power of the at least one controllable load 301 is based on the nominal power output of the inverter 200. The power manager 201c additionally increases the power consumed by the at least one controllable load 301 only when the derating state of the energy source 100 is active. In other words, the power manager 201c additionally increases the power consumed by the at least one controllable load 301 by the predefined value when the energy source 100 is in the derating state. In an embodiment, the derating state of the energy source 100 refers to the operation of the energy source 100 at a level less than an instantaneous maximum capability of the energy source 100 considering the solar radiation. If the derating state of the energy source 100 is not active, then the power manager 201c does not additionally increase the power of the at least one controllable load 301 by the predefined value.

In a scenario where the power manager 201c determines no export condition violation based on the inverter power transfer and the grid power transfer the power manager 201c takes into account the grid power transfer and the derating state of the energy source 100 to further vary the power output of the inverter 200 and the power consumption of the at least one controllable load 301.

The power manager 201c decreases the power of the at least one controllable load 301 depending on, in particular directly proportional, to the measured grid power transfer, when the energy source 100 is not in the derating state and under the presence of grid power transfer. That is, the power manager 201c decreases the power of the at least one controllable load 301 based on a magnitude of the power transferred from the grid 400 to the load network 300. The power manager 201c does not vary the power output of the inverter 200.

Further, after the completion of the decrease in the power of the at least one controllable load 301 based on the magnitude of the determined grid power transfer, the power manager 201c again checks whether the energy source 100 continues to be in the derating state. If the energy source 100 continues to be in the derating state, then the power manager 201c further increases the power of the at least one controllable load 301 by the predefined value. Here, the increase in the power of the at least one controllable load 301 by the predefined value based on the derating state of the energy source 100 is substantially greater than the decrease in the power of the at least one controllable load 301 based on the magnitude of the grid power transfer. In case the energy source 100 is not in the derating state after the completion of the decrease in the power of the at least one controllable load 301 based on the magnitude of the grid power transfer, then the power manager 201c does not increase the power of the at least one controllable load 301 by the predefined value.

The power manager 201c decreases, in a possible embodiment, the power of the at least one controllable load 301 and increases the power output of the inverter 200 proportional to the determined grid power transfer, when the energy source 100 is in the derating state and under the presence of the grid power transfer. That is, the power manager 201c decreases the power of the at least one controllable load 301 and increases the power output of the inverter 200 based on a magnitude of the power transferred from the grid 400 to the load network 300. Further, after the completion of the decrease in the power of the at least one controllable load 301 and increase in the power output of the inverter 200 which is proportional to the grid power transfer, the power manager 201c again checks whether the energy source 100 continues to be in the derating state. If the energy source 100 continues to be in the derating state, then the power manager 201c further increases automatically the power of the at least one controllable load 301 by the predefined value. If the energy source 100 does not continue to be in the derating state, then the power manager 201c does not further increase the power of consumed by the at least one controllable load 301 by the predefined value.

In the following, a scenario is considered where the power manager 201c determines no export condition violation and no grid power transfer. The power manager 201c checks whether the energy source 100 is in the derating state. The power manager 201c increases the power consumption of the at least one controllable load 301 by the predefined value when the energy source 100 is in the derating state. When the energy source 100 is not in the derating state, then the power manager 201c does not increase the power of the at least one controllable load 301 by the predefined value.

Thus, the inverter 200 utilizes maximum available power at the photovoltaic energy source 100 in real-time by controlling the at least one controllable load 301 to increase the power consumption until each of the at least one controllable load 301 reach a maximum consumable power or when the power generated by the energy source 100 does not raise any further, and also maintaining the grid feed-in restrictions as defined by the authorities of a region which can be defined as export condition violation rules in a configuration file. The configuration file can comprise different rules for different regions or locations. It is also possible that different configuration files are provided for different regions. In an embodiment, the processor 201 of the inverter 200 continuously repeats the process of increasing the power consumption of the at least one controllable load 301. This in turn increases the self-consumption of power from the energy source 100. In another embodiment, the processor 201 of the inverter 200 repeats the process at predefined intervals of time since the available maximum power from the energy source 100 varies with time.

Figure 2:
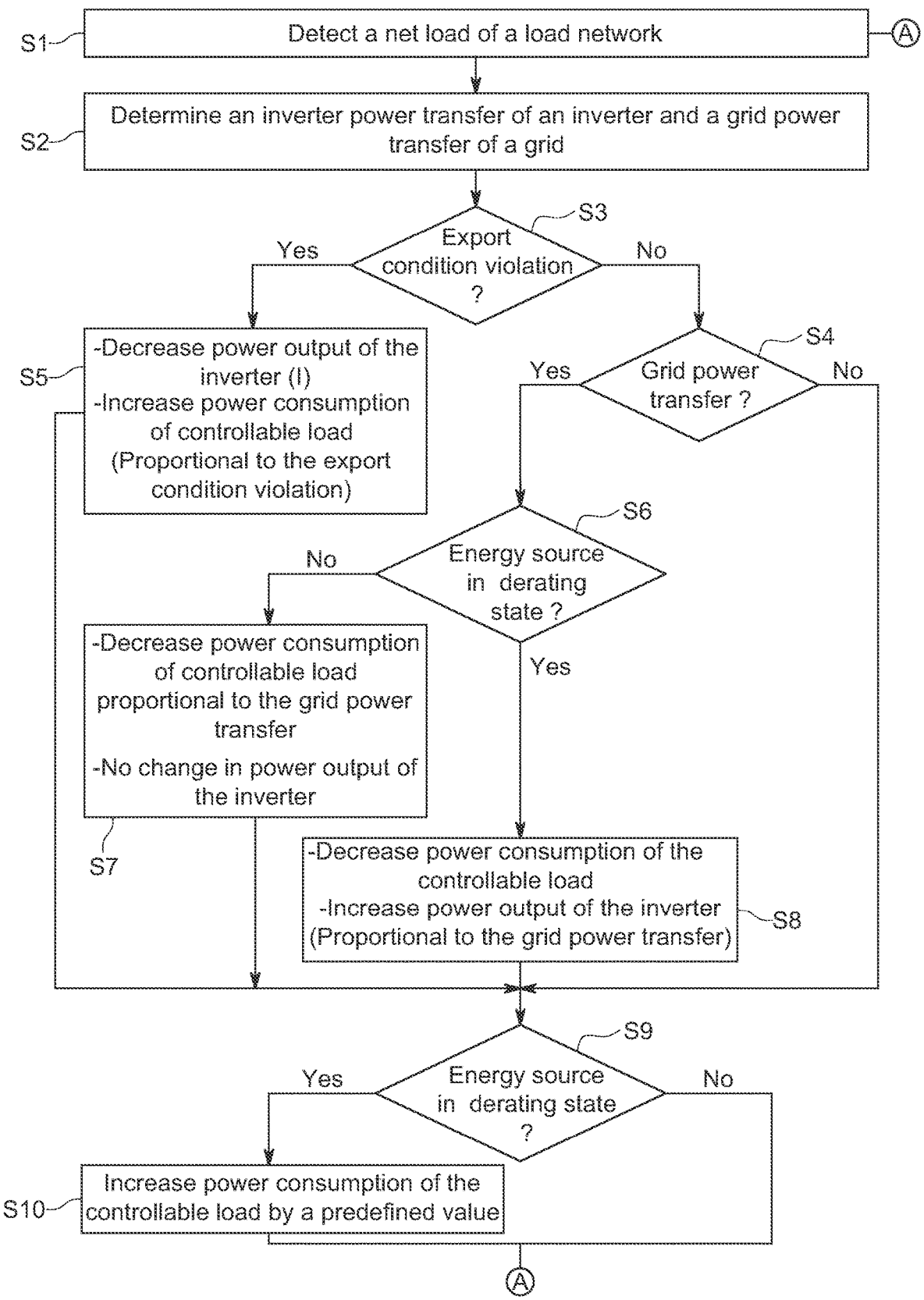
FIG. 2 illustrates a flowchart of a method for operating the inverter for optimization of power generation of an energy source in accordance with a second aspect of the present invention.

FIG. 2 illustrates a flowchart of a method for operating the inverter 200 for optimization of power generation in accordance with a second aspect of the present invention.

At step S1, the net load detector 201a of the processor 201 detects a net load of the load network 300. At step S2, the power export analyzer 201b determines the inverter power transfer of the inverter 200 and the grid power transfer of the grid 400. The inverter power transfer is a power transfer from the inverter 200 to the load network 300 and/or to the grid 400. The grid power transfer is a power transfer from the grid 400 to the load network 300. The grid 400 comprises a utility grid.

At step S3, the power manager 201c determines whether there is an export condition violation based on the determined inverter power transfer and/or the determined grid power transfer. Further, the power manager 201c can determine an extent of the export condition violation. An export condition violation and its extent can be determined by evaluating the current inverter power transfer and the current grid power transfer as measured by means of sensors and/or smart metering devices based on defined rules which can be loaded from a configuration file or hardwired in a programmable logic. If the power export analyzer 201b determines an export condition violation, then the power manager 201c decreases automatically the power output by the inverter 200 and increases automatically the power consumption of the at least one controllable load 301 depending on the determined amount or extent of the export condition violation as in step S5. In a possible embodiment, the decrease of the power output of the inverter 200 and/or the increase of the power consumption is proportional to the determined amount of the export condition violation. Further, at step S9, the power manager 201c again checks whether the energy source 100 continues to be in the derating state. At step S10, if the energy source 100 continues to be in the derating state, then the power manager 201c further increases the power of the at least one controllable load 301 by the predefined value.

An export condition violation detected in step S3 by the power manager 201c can be notified via the user interface 202 or reported to a remote central controller.

At step S4, the power manager 201c considers the grid power transfer after the power manager 201c has determined in step S3 that there is no export condition violation based on the determined inverter power transfer and the determined grid power transfer. The power manager 201c further takes into account the current (momentary) derating state of the energy source 100 as in step S6 to further vary the AC-power output of the inverter 200 and the power consumption of the at least one controllable load 301. If there is a grid power transfer and if the energy source 100 is in the derating state the control routine proceeds with step S8. If there is a grid power transfer and if the energy source 100 is not in a derating state the control routine proceeds with step S7.

At step S7, the power manager 201c decreases the power of the at least one controllable load 301 depending on the determined grid power transfer, when the energy source 100 is not in the derating state and under the presence of the grid power transfer. Further, at step S9, the power manager 201c again checks whether the energy source 100 continues to be in the derating state. At step S10, if the energy source 100 continues to be in the derating state, then the power manager 201c further increases the power of the at least one controllable load 301 by the predefined value.

At step S8, the power manager 201c decreases the power consumption of the at least one controllable load 301 and increases the power output of the inverter 200 depending on the determined grid power transfer, when the energy source 100 is in the derating state and under the presence of the grid power transfer. Further, at step S9, the power manager 201c again checks whether the energy source 100 continues to be in the derating state. At step S10, if the energy source 100 continues to be in the derating state, then the power manager 201c further increases the power consumed by the at least one controllable load 301 by the predefined value.

At step S3, if the power manager 201c determines that there is no export condition violation, and at step S4, if the power manager 201c determines no grid power transfer, then the power manager 201c again checks whether the energy source 100 is in the derating state as in step S9. At step S10, if the energy source 100 is in the derating state, then the power manager 201c increases the power consumed by the at least one controllable load 301 by the predefined value. The power manager 201c again repeats the process from step S1 based on the decision at step S9.

The method reduces waste of unknown surplus power generated at the energy source 100 during the derating state of the energy source 100. The processor 201 initiates a maximum power point tracking (MPPT) by allowing the at least one controllable load 301 to consume additional power even when no surplus power is available. This in turn allows the inverter 200 to generate more power from the energy source 100 for the load network 300. The processor 201 allows the at least one controllable load 301 to increase its power consumption until each of the at least one controllable load 301 does reach a maximum consumable power or when the power generated by the energy source 100 does not raise any further. Moreover, the method does not rely on special thresholds for setting up a set point for the inverter 200.

The inverter 200 thus, increases the consumption of self-produced power, maintaining zero power fed into the grid 400. The method is efficient and cost-effective by consuming the produced power rather than obtaining power from the grid 400. The power transmitted to the grid 400 is equal to zero at any instance of time. The term "equal to zero" should not be understood as the exact number zero but as a range around zero. It should not be limited to zero feed-in condition but may also be equal to a certain value, for example, in order to meet specific power grid 400 requirements.

The computer implemented control routine illustrated in the flow chart of FIG. 2 can be executed by a program run on the processor 201 of the inverter 200. This program can be executed in the background continuously and periodically in a real time control loop.

The control program illustrated in the flow chart of FIG. 2 can in a possible embodiment be loaded as an application from a server of a platform and deployed in a program memory of the inverter 200.

The provision of loadable control apps and configuration files for different types of inverters 200 and/or for different installation locations allows a flexible worldwide use of the power generation system 1000 according to the present invention. In a possible embodiment the inverter 200 notifies a remote cloud server about parameters of the inverter and/or parameters of the connected energy source 100 as well as about its current installation location (e.g. coordinates) to trigger a download of a fitting control application and/or fitting configuration file suited to the type of the inverter 200 and to the power export regulations at the site of the power generation system 1000.

The invention claimed is:

1. An inverter connected to an energy source and configured to supply power to a load network comprising at least one controllable load, said inverter comprising a processor adapted to control the at least one controllable load of the load network, the processor comprising:
   a net load detector configured and adapted to detect a net load of the load network;
   a power export analyzer configured and adapted to determine an inverter power transfer of the inverter and a grid power transfer of a grid to the load network; and
   a power manager configured and adapted to vary a power output of the inverter and a power consumption of the at least one controllable load based on the determined inverter power transfer, the determined grid power transfer, an export condition violation based on an allowable amount of power transfer to the grid, and a derating state of the energy source;
   wherein the power manager is configured and adapted to perform the following steps;
   decreasing power consumption of the at least one controllable load depending on the grid power transfer, in response to determining the energy source is not in the derating state, under a presence of the grid power transfer and no export condition violation;
   checking the derating state of the energy source; and
   increasing the power consumption of the at least one controllable load by a predefined value in response to determining the energy source is in the derating state.

2. The inverter as claimed in claim 1, wherein the derating state of the energy source is indicated by a derating state flag read by the processor of the inverter.

3. The inverter as claimed in claim 1, wherein the inverter power transfer includes a power transfer from the inverter to the load network and/or to the grid.

4. The inverter as claimed in claim 1, wherein the grid power transfer is a power transfer from the grid to the load network.

5. The inverter as claimed in claim 1, wherein the power manager is configured and adapted to determine the export condition violation based on the determined inverter power transfer and/or the determined grid power transfer.

6. The inverter as claimed in claim 1, wherein the power manager is configured and adapted to decrease the power output of the inverter and increase the power consumption of the at least one controllable load proportional to an extent of the export condition violation.

7. The inverter as claimed in claim 1, wherein the power manager is configured and adapted to perform the following steps:
   decreasing the power output of the inverter and increasing the power consumption of the at least one controllable load depending on the export condition violation; and subsequently
   checking the derating state of the energy source; and
   increasing power consumption of the at least one controllable load when the energy source is in the derating state.

8. The inverter as claimed in claim 1, wherein the power manager is configured and adapted to perform the following steps:
   decreasing the power consumption of the at least one controllable load and increasing the power output of the inverter proportional to the grid power transfer, in response to determining the energy source is in the derating state, under the presence of the grid power transfer and no export condition violation; and subsequently
   checking the derating state of the energy source; and
   increasing the power of the at least one controllable load when the energy source is in the derating state.

9. The inverter as claimed in claim 1, wherein the power manager is configured and adapted to perform the following steps:
   checking the derating state of the energy source under an absence of the grid power transfer and no export condition violation; and
   increasing power consumption of the at least one controllable load when the energy source is in the derating state.

10. A method for operating an inverter for optimization of power generation of an energy source, said method comprising the steps of:
    detecting a net load of a load network;
    determining an inverter power transfer of the inverter and a grid power transfer of a grid to the load network; and
    controlling the power output of the inverter and a power consumption of at least one controllable load of the load network based on the determined inverter power transfer, the determined grid power transfer, a detected export condition violation based on an allowable amount of power transfer to the grid, and a derating state of the energy source;
    wherein controlling the power output of the inverter and the power consumption of at least one controllable load of the load network comprises:
    decreasing power consumption of the at least one controllable load depending on the grid power transfer, in response to determining the energy source is not in the derating state, under a presence of the grid power transfer and no export condition violation;
    checking the derating state of the energy source; and
    increasing the power consumption of the at least one controllable load by a predefined value in response to determining the energy source is in the derating state.

11. The method as claimed in claim 10, wherein the determined inverter power transfer comprises a power transfer from the inverter to the load network and/or to the grid.

12. The method as claimed in claim 10, wherein the determined grid power transfer comprises a power transfer from the grid to the load network.

13. The method as claimed in claim 10, wherein the export condition violation is determined based on the determined inverter power transfer and/or the determined grid power transfer.

14. The method as claimed in claim 10, further comprising the steps of: decreasing automatically the power output of the inverter and increasing automatically the power consumption of the at least one controllable load of the load network proportional to the determined export condition violation.

15. A power generation system comprising:
    an inverter connected to an energy source and configured to supply power to a load network including at least one controllable load, said inverter including a processor configured and adapted to control the at least one controllable load of the load network,
    the processor of said inverter including;
    a net load detector configured and adapted to detect a net load of the load network;

a power export analyzer configured and adapted to determine an inverter power transfer of the inverter and a grid power transfer of a grid to the load network; and a power manager configured and adapted to vary a power output of the inverter and a power consumption of the at least one controllable load based on the determined inverter power transfer, the determined grid power transfer, an export condition violation based on an allowable amount of power transfer to the grid, and a derating state of the energy source;

wherein the power manager is configured and adapted to perform the following steps;

decreasing power consumption of the at least one controllable load depending on the grid power transfer, in response to determining the energy source is not in the derating state, under a presence of the grid power transfer and no export condition violation;

checking the derating state of the energy source; and increasing the power consumption of the at least one controllable load by a predefined value in response to determining the energy source is in the derating state.

* * * * *